(12) United States Patent
Chu et al.

(10) Patent No.: US 6,766,291 B2
(45) Date of Patent: Jul. 20, 2004

(54) METHOD AND APPARATUS FOR CONTROLLING THE TRANSITION OF AN AUDIO SIGNAL CONVERTER BETWEEN TWO OPERATIVE MODES BASED ON A CERTAIN CHARACTERISTIC OF THE AUDIO INPUT SIGNAL

(75) Inventors: Chung Cheung C. Chu, Brossard (CA); Rafi Rabipour, Cote St-Luc (CA); David G. Sloan, Verdun (CA)

(73) Assignee: Nortel Networks Limited, St-Laurent (CA)

(*) Notice: Subject to any disclaimer, the term of this patent is extended or adjusted under 35 U.S.C. 154(b) by 0 days.

(21) Appl. No.: 09/335,743

(22) Filed: Jun. 18, 1999

(65) Prior Publication Data

US 2003/0125960 A1 Jul. 3, 2003

(51) Int. Cl.[7] .................. G10L 11/02; G10L 21/04; H04J 3/16
(52) U.S. Cl. ..................... 704/215; 370/521
(58) Field of Search .................. 704/200, 201, 704/210, 215, 226; 370/521, 522, 523

(56) References Cited

U.S. PATENT DOCUMENTS

| | | | |
|---|---|---|---|
| 5,768,308 A | | 6/1998 | Pon et al. |
| 5,774,847 A | | 6/1998 | Chu et al. |
| 5,793,810 A | | 8/1998 | Han et al. |
| 5,911,128 A | * | 6/1999 | DeJaco .................. 704/200.1 |
| 5,943,645 A | * | 8/1999 | Ho et al. .................. 704/226 |
| 6,009,383 A | * | 12/1999 | Mony .................. 704/200 |
| 6,034,994 A | * | 3/2000 | Yoon .................. 375/242 |
| 6,070,089 A | * | 5/2000 | Brophy et al. .................. 370/522 |
| 6,078,809 A | * | 6/2000 | Proctor .................. 455/416 |
| 6,091,969 A | * | 7/2000 | Brophy et al. .................. 370/522 |
| 6,185,424 B1 | * | 2/2001 | Pon et al. .................. 455/445 |
| 6,483,857 B1 | * | 11/2002 | Sloan et al. .................. 370/522 |

OTHER PUBLICATIONS

Yasuda et al., "Network functions for the application of multi-rate speech coding in digital cellular systems," 1994 IEEE 44th Vehicular Technology Conference, 8–10 Jun. 1994, vol. 1, pp. 306–310.*

* cited by examiner

*Primary Examiner*—Richemond Dorvil
*Assistant Examiner*—Martin Lerner

(57) ABSTRACT

The invention relates to a method and apparatus for controlling the transition of a bypass capable codec between operative modes, based on a certain characteristic of the audio data signal processed by the codec. The apparatus relies on a control signal to determine when the codec will switch from one mode to another. This control signal reflects a characteristic of the audio data signal received at the apparatus, such as the type of speech activity or the format of the audio data signal. When in the active (non-bypass) mode, the apparatus relies on an additional control signal to switch to the inactive (bypass) mode. This additional control signal is received from a control unit at a remote codec that indicates that the remote codec is also bypass capable, hence the decoder at the first codec and the encoder at the remote codec can switch to the inactive mode to pass between them the compressed data frames.

20 Claims, 3 Drawing Sheets

METHOD AND APPARATUS FOR CONTROLLING THE TRANSITION OF AN AUDIO SIGNAL CONVERTER BETWEEN TWO OPERATIVE MODES BASED ON A CERTAIN CHARACTERISTIC OF THE AUDIO INPUT SIGNAL

FIELD OF THE INVENTION

This invention relates to signal processing and more particularly to a method and apparatus for enabling the transition of an audio data signal converter between the active mode and the inactive mode, based on certain characteristics of the audio data signal. This invention finds applications in digital communication systems, such as a digital cellular system or a Voice-over-IP (VoIP) system, in particular vocoder bypass capable systems that can selectively enable the activation or is de-activation of the decoding and encoding functions in the connection.

BACKGROUND OF THE INVENTION

In a digital communication system such as a wireless system or a VoIP system, an audio signal may be processed by a series of speech encoders and decoders as it is transmitted from one endpoint to another. In the example of a digital cellular mobile-to-mobile connection, the audio data signal is first encoded by a speech encoder at the first mobile telephone and transmitted in an encoded format to a base transceiver station of a cell site where it is transferred to the base station controller servicing that cell site. At the base station controller, the encoded speech information is processed by a compatible speech decoder that converts the compressed speech stream into PCM samples. The PCM samples are then transported over the landline network, such as the PSTN, toward the base station controller servicing the cell site communicating with the other mobile telephone. At the second base station controller, the PCM speech samples are again processed by a speech encoder. The encoded information is sent from the base transceiver station of the cell site to the second mobile telephone where the compressed speech stream is converted one more time by a speech decoder into PCM samples that can be used to generate an audio signal In this, codecs on both sides of the mobile-to-mobile call are connected in tandem, which is known to degrade the speech quality as a result of the successive encoding/decoding of the audio data signal.

The "vocoder bypass" technique alleviates this problem, specifically when the codecs on both sides of the connection are identical. During a connection, when the codecs at the base station controllers are made aware of their mutual existence, they are switched off such that the encoded speech information arriving at the first base station controller flows in encoded format through the PSTN and arrives as such at the second base station controller. This procedure eliminates one decoding operation of the speech signal at the first base station controller and one re-encoding operation of the signal at the second base station controller. As a result, the audio quality is significantly improved.

When in vocoder bypass mode, the two base station controllers exchange units of compressed data. Each of these units contains an identifier, where this identifier is representative of the compressed state of the data. For each data unit received by the second base station controller when in bypass mode, the identifier is read from the data unit and used to confirm that the unit actually contains compressed information. The data unit is then processed accordingly and transmitted to the second mobile telephone without first being re-encoded, as would occur in non-bypass mode. In the absence of such an identifier, the second base station controller will conclude that the first base station controller is no longer sending compressed data and that communication in the direction from the first base station controller to the second base station controller is in the form of PCM speech samples. Consequently, the second base station controller will switch back to non-bypass mode in that direction.

For additional information on the "vocoder bypass" technique, the reader is invited to refer to the U.S. Pat. No 5,768,308 granted to the present assignee that describes the process in great detail. The contents of this document are hereby incorporated by reference.

The codec in one base station controller can switch to the bypass mode as a result of an in-band hand-shaking operation with the codec in the other base station controller. Transmitting control information from one codec to the other over the audio data stream allows this hand-shaking operation to take place. The control information is transmitted by bit stealing. This is effected by inserting in selected PCM samples bits from the control information signal.

Once the handshaking operation is completed, the decoder of the codec in one base station controller and the encoder of the codec in the other base station controller are caused to transition to the inactive mode. This transition may be audibly detectable, in that it may cause distortion over the transmission medium of the connection for a short period of time. This is undesirable as ideally the transition should be made in a manner as transparent as possible to the user.

SUMMARY OF THE INVENTION

The present invention provides a signal processor for effecting the conversion of an audio data signal from one format to another. The signal processor has a signal converter that can selectively acquire two operative modes, namely a first operative mode and a second operative mode. In the first operative mode, the signal converter transforms the audio data signal from one format to another and releases the converted audio data signal from the output of the signal processor. In the second operative mode, the signal converter is disabled and permits passage of the audio data signal to the output without conversion.

The signal processor has a control unit for controlling the transition of the signal converter between operative modes. The control unit is responsive to a first control signal representative of a certain characteristic of the audio data signal to enable the signal converter to switch from the active/inactive mode to the inactive/active mode.

The signal processor can find applications in digital communication systems, such as a digital cellular system or a Voice-over-IP (VOIP) system, in particular codec bypass capable systems that can selectively enable the activation or de-activation of the encoding and decoding functions in the connection. In a preferred embodiment, the audio data signal is an encoded signal that includes a succession of data frames. The signal converter has a codec with a decoder, located at a base station of the network that receives the audio data signal from the mobile telephone. In the active mode of the signal converter, the decoder converts the audio data signal into PCM format and sends it to a remote base station over a landline network, such as the PSTN (Public Switched Telephone Network). In the inactive mode, the signal converter passes the encoded audio data, namely the compressed data frames, to the output of the signal processor without decoding the data.

At the remote base station that receives the audio data signal from the first base station, the signal converter has a codec with an encoder. In the active mode of the signal converter, the encoder converts the audio data signal from PCM format to compressed format and sends the encoded data to the corresponding mobile telephone. In the inactive mode, the signal converter passes the encoded audio data received from the first base station to the corresponding mobile telephone without re-encoding the data.

In a specific example, the control signal representative of a certain characteristic of the audio data signal that enables the signal converter to transition from the first operative mode to the second operative mode reflects the type of speech activity in the audio data signal. When the type of speech activity is representative of a certain condition whereby the transition will not harm the audio data signal, such as the absence of speech activity or a low level of speech activity, the control unit allows the transition. This feature is advantageous because the transition is completed in a manner substantially transparent to the user.

The transition from the active mode to the inactive mode may require additional procedures, such as handshaking operations between the signal processors in each base station of the connection. The control signal indicative of the type of speech activity in the audio data signal does not by itself, in such embodiments, effect the transition. The control signal allows the transition to be effected at the opportune time to enhance speech quality.

The invention also provides a method for processing an audio data signal. According to the method, the audio data signal is received and a first control signal representative of a type of speech activity in the audio data signal is provided. By default, the audio data signal is converted from a first format to a second format, where in the first format the audio data signal is compressed data and in the second format the audio data signal is de-compressed data. Conversion of the audio data signal from a first format to a second format can be omitted when the type of speech activity in the audio data signal is representative of a certain condition, such as the absence of speech activity or a low level of speech activity.

The invention also extends to a transmission system using the signal processor described above.

In another example of implementation, the selected characteristic that controls the transition between the operative modes of the signal converter is the format of the audio data signal. Specifically, the audio data signal can be sent under two different conditions. In the first condition, the speech sound information is conveyed under both the first format and the second format. One possibility of accomplishing this is to superimpose the audio data signal in the first format onto the audio data signal in the second format. In the second condition, the speech sound information is conveyed under the second format. The control unit of the signal processor receives the audio data signal from a remote signal processor in either the first condition or the second condition. The control unit determines whether the received audio data signal is in the first or the second condition. If the first condition is detected, the signal converter is set to allow the audio data signal to pass to the output without conversion. If the second condition is detected, the signal converter is set to encode the received audio data signal and pass the compressed data to the output.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENT

Figure 1:
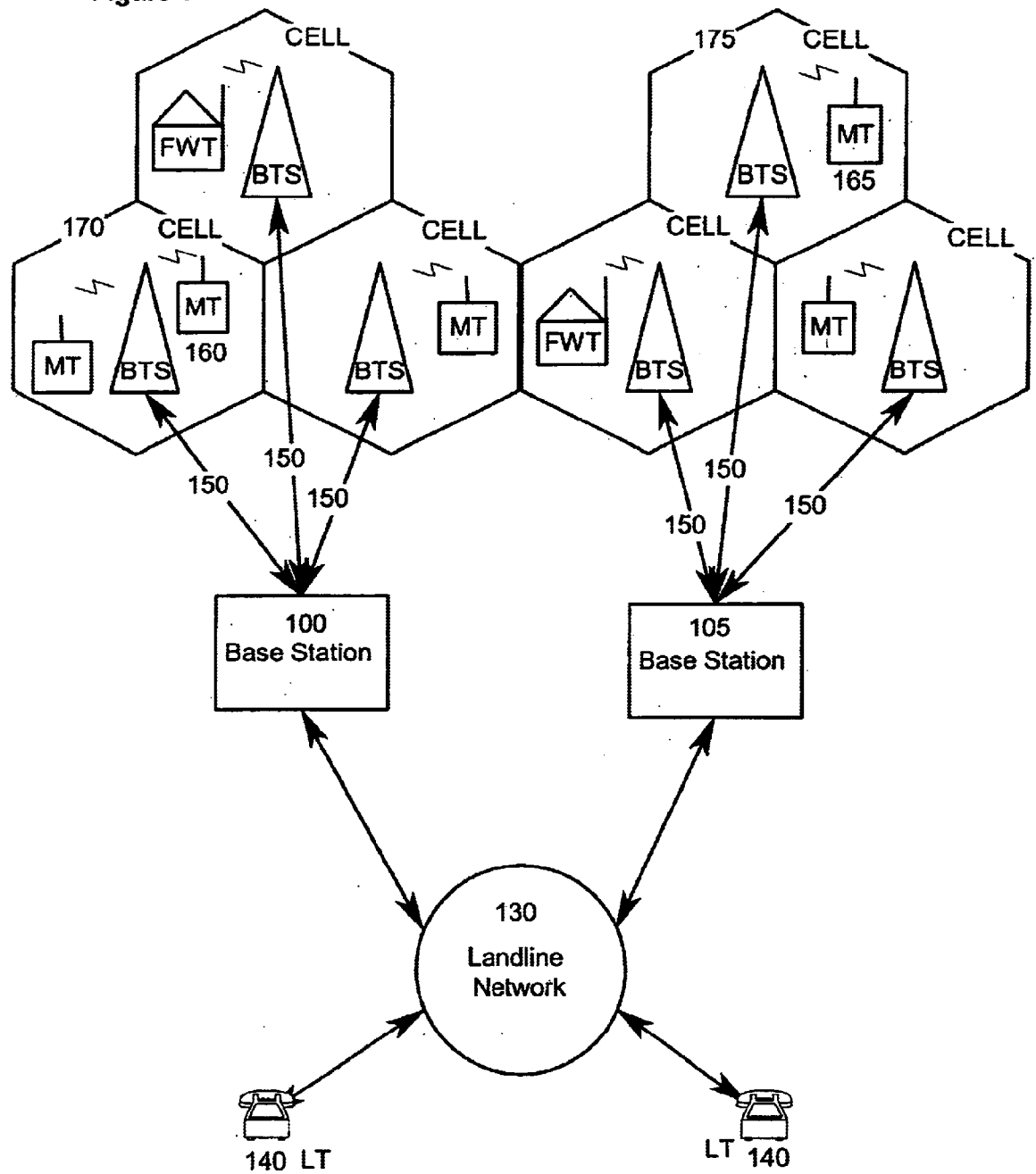
FIG. 1 is a block diagram illustrating a mobile-to-mobile digital cellular system connection through the PSTN.

FIG. 1 is a block diagram representation of a portion of a cellular wireless telecommunications network. In this figure, Mobile Terminals (MT) are on the move in the hexagonal areas defined as cells. Fixed wireless terminals (FWT) are also included in the areas defined as cells. Each cell covers a predetermined geographical area and has a Base Transceiver Station (BTS), which communicates through radio channels with the MTs and FWTs. A typical communication protocol between the BTSs and the MTs and FWTs may be a TDMA protocol. Alternatively, the communication protocol could be a CDMA or GSM protocol, among others. For purposes of illustration, assume hereinafter that a TDMA protocol is in effect. A number of these BTSs (i.e. cells) may be connected by land line or microwave link 150 to one Base Station Controller 100, 105 (BSC), which controls handoff functions, among others, and routes the signal as requested. Each BSC 100, 105 is connected to a landline network 130. The landline network 130 may include, among others, the Public Switched Telephone Network (PSTN), the Integrated Services Digital Network and the Internet. Land terminals 140 (LT) connected to the landline network 130 are also shown for completeness.

In a specific call scenario, a first subscriber 160 is communicating with a second subscriber 165 via a first cell site 170 and BSC 100 and a second cell site 175 and BSC 105. The BSCs 100 and 105 communicate with each other over the landline network 130.

Figure 2:
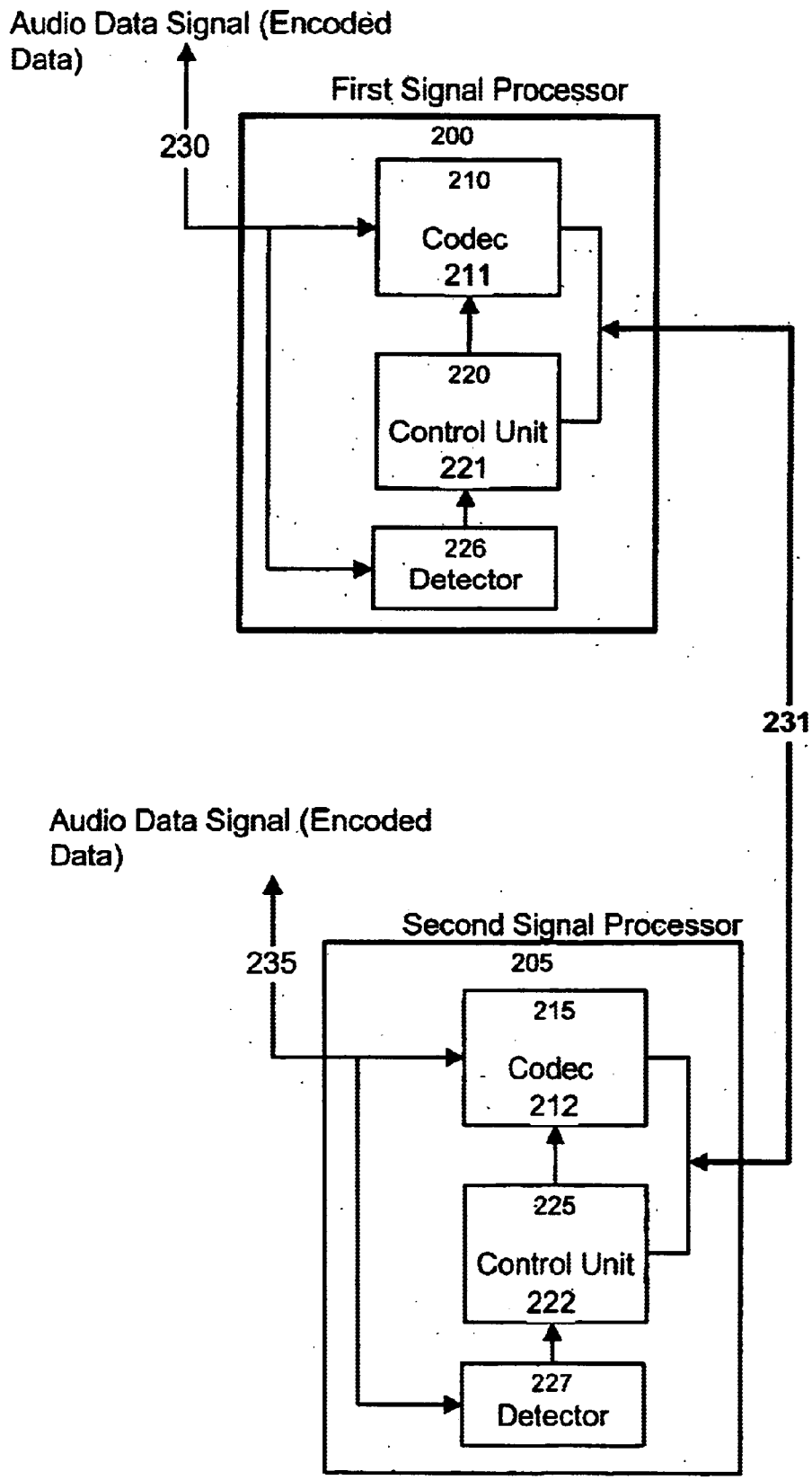
FIG. 2 is a block diagram illustrating the signal processors in two respective base station controllers of the digital cellular system of FIG. 1, that implement the novel signal processor in accordance with an embodiment of the present invention.

Each BSC 100, 105 comprises a digital signal processor. With reference to FIG. 2, the signal processor 200 is associated with the BSC 100, while the signal processor 205 is associated with the BSC 105. The digital signal processor 200 includes a codec 210 that provides the capability of voice transcoding from mu-law (or A-law PCM depending on which format is being used) to a compressed format (in accordance with the standard being used), and vice versa. The digital signal processor 205 includes a codes 215 that carries out same transformations. In a particular example, the compressed format in use is VSELP (Vector Sum Excited Linear Prediction).

The digital signal processors 200 and 205 are connected to one another by a transmission facility 231 that could be a signal transmission path through the landline network 130. For the purpose of this example, the transmission facility 231 includes a T1 connection.

The digital signal processor 200 includes a control unit 220 that effects a handshaking procedure with the digital signal processor 205 to establish, if possible, a codec bypass condition. A control unit 225 is provided in the digital signal processor 205 to handle the handshaking function at the signal processor 205 side. In use, the control units 220 and 225 exchange control signals over the transport facility 231.

These control signals are multiplexed with the audio data stream transported over the transport facility 231. Alternatively, the control signals may be sent separately over the transport facility 231, in parallel with the audio data stream. When the handshaking operation is completed control unit 220 issues a local signal at input 211 to codec 210, so that the decoding function is disabled. Similarly, control unit 225 issues its own local signal at input 212 to codec 215, so that the encoding function is disabled. For instance, encoded (compressed) audio data applied at the input 230 of the signal processor 200 is passed without being decoded through the transport facility 231. When the compressed audio data reaches the signal processor 205 it passes to the output 235 without being re-encoded and is directed to the mobile telephone 165 forming the end of the connection. This process will be described in greater detail later in this specification.

Digital signal processors are generally comprised of multiple signal processors commercially available from a number of suppliers. One such processor is Motorola's 560001 DSP.

When a TDMA mobile-to-mobile connection such as shown in FIG. 1 and in FIG. 2 is realized, two digital signal processors are involved in the connection. Normally, audio data signal that is audio information in an encoded format (such encoding has been effected at the mobile telephone 160) is introduced at an input 230 of the digital signal processor 200. Without any codec bypass procedure invoked, the audio data signal is passed to the decoder unit of the codec 210 and decoded into PCM format. Next, the PCM samples are transported to the digital signal processor 205 over the transport facility. The encoder unit of the codec 215 re-encodes the PCM samples that can then be sent to the mobile telephone 165.

This successive decoding/encoding operation introduces delay and perceptible coding noise that degrades the quality of voice signal. Note that such degradation of speech quality due to successive decoding/encoding operation may occur in a digital communication system other than a wireless system, for example a packet network implementing VoIP. Further, the present invention is applicable to network configurations in which a packet network may interconnect with another network type such as a circuit switched network or a wireless network.

The codec bypass feature described in detail in the U.S. Pat. No. 5,768,308 is particularly advantageous for TDMA mobile-to-mobile communications realized with two bypass-capable digital signal processors connected to one another as shown in FIG. 2. Codec bypass realization is based on determining that one digital signal processor is directly linked with another digital signal processor in a digital communication system connection.

In a typical interaction, the digital signal processor 200 sends to the digital signal processor 205 a control information signal that is essentially an identifier. As briefly discussed earlier, this handshaking function is handled by the control units 220 and 225. When the control unit 225 of the digital signal processor 205 receives this signal, it returns to the control unit 220 of the digital signal processor 200 an acknowledgement message. Upon reception of the acknowledgement message the control unit 220 of the digital signal processor 200 issues yet another control message to the control unit 225 and activates the bypass mode (i.e. inactive mode) by sending to the codec 210 a control signal at input 211 so that the decoder of codec 210 is de-activated. This means that the incoming stream of encoded frames from the mobile telephone 160 is passed as such in the transport facility 231. When the control unit 225 of the digital signal processor 205 receives the bypass control message from the control unit 220, the control unit 225 issues a local control signal that causes the encoder of codec 215 to acquire the bypass mode (i.e. inactive mode) such that the encoded audio frames are transmitted through the signal processor 205 without being re-encoded.

The communication process between the control units 220 and 225 is independent of the speech encoding/decoding operations. For the purpose of this description it is not necessary to elaborate on how the control information signals used to perform the handshaking procedures between the control units 220 and 225 are generated nor how they are processed when received to invoke the bypass mode. For more details on these points the reader is invited to refer to the U.S. Pat. No. 5,768,308.

In order to more precisely control the transition to the bypass mode of each codec 210, 215 each control unit 220, 225 is provided with an input 221, 222 that receives a signal representative of the type of speech activity in the input audio data signal. In the signal processor 200, this signal is obtained from a detector 226 that receives the audio data signal and processes it to determine if it contains speech information. The detector 226 may be any of a number of known forms of detector that is capable of distinguishing a characteristic of the audio data signal which is representative of a certain condition, such as the absence of speech activity or a low level of speech activity.

Assuming that the certain condition is the absence of speech activity, examples of relevant speech detectors are disclosed in U.S. Pat. No. 5,774,847, which issued Jun. 30, 1998 to Chu et al. and was assigned to Northern Telecom Limited. The contents of this document are incorporated herein by reference. Most preferably, the detector 226 analyses each data frame in the audio data signal. The detector operates on the coefficients segment of the data frame to determine whether it contains speech sounds or non-speech sounds.

Continuing with the above example wherein the certain condition is the absence of speech activity, the output signal of the detector 226 that is received in the input can be a simple binary signal, each state designating the speech/non-speech nature of the current data frame. Thus when the current data frame contains speech sounds then the output signal of the detector 226 acquires one state, this state blocking the control unit 220 from causing the codec 210 to transition to the inactive state. However, when the current data frame contains non-speech sounds, then the signal issued by the detector 226 changes and the control unit 220, assuming it has completed a successful handshaking procedure with the control unit 225, allows the transition in codec 210 to be effected. In this example, the control signal issued by the detector 226 merely allows or inhibits the transition from taking place and does not on its own suffice to effect that transition.

The control unit 225 in the second signal processor 205 is also enabled by a detector 227 that operates on the audio data signal travelling from the second signal processor 205 toward the first signal processor 200. The structure and operation of the detector 227 is the same as the structure and operation of the detector 226.

Note that a person skilled in the art would recognize that if the transition from active mode to inactive mode is to be generally based on a certain condition other than the absence of speech activity, such as a low level of speech activity or the presence of a particular segment of speech, different types of detectors could be used. The choice of detector depends on the certain condition to be detected.

As described earlier, when the digital communication system is in bypass mode, signaling information is sent from the transmitting base station controller to the receiving base station controller to confirm that the communication is still in the form of compressed data. The absence of this signaling information indicates to the receiving base station controller that communication in the direction from the sending base station controller to the receiving base station controller has been switched to non-bypass mode. This signaling information takes the form of identifiers coupled to the compressed data units, and thus requires the allocation of extra bits for each unit of data.

Figure 3:
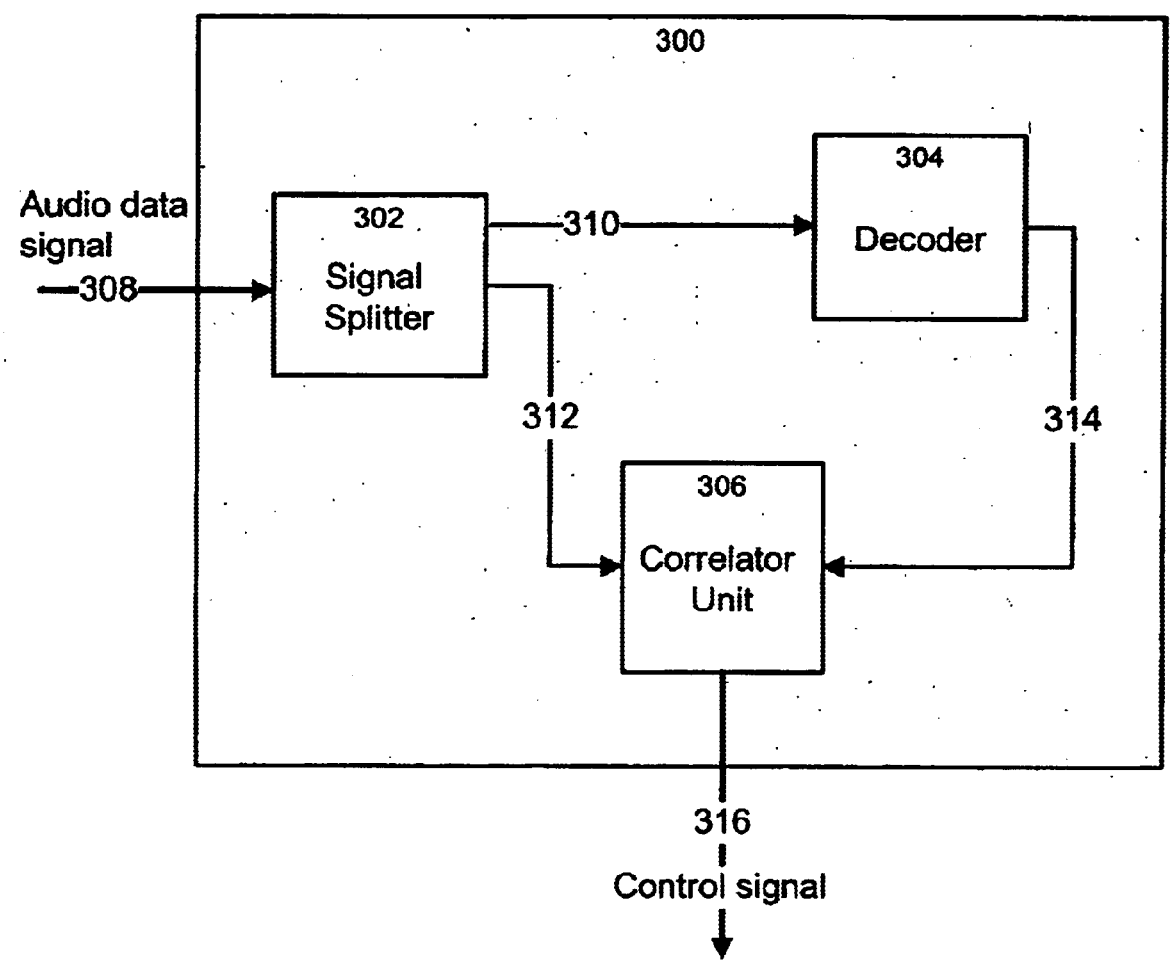
FIG. 3 is a block diagram of a control unit in the base station controller, in accordance with an embodiment of the present invention.

In another embodiment of the present invention, the digital communication system also implements a condition detection procedure that provides a confirmation of the form of communication to the base station controller such that a reduced amount of signaling information or no additional signaling information is required. The condition detection procedure is implemented by the control unit of each base station controller and provides for the transition from bypass to non-bypass mode of a receiving base station controller on the basis of a characteristic of the audio data signal received from a sending base station controller, specifically the format of the audio data signal. As shown in FIG. 3, the control unit 300 of the base station controller comprises a signal splitter 302, a local decoder 304 and a correlator unit 306, each of which will be described in further detail below.

Specific to the sending base station controller, when in bypass mode each unit of compressed data received from the sending mobile terminal is first decoded to reveal the corresponding set of PCM speech samples. The compressed data unit is then superimposed onto the corresponding set of PCM speech samples and the resulting data unit, containing both compressed and PCM format data, is transmitted to the receiving base station controller. Bit-stealing may be used to effect the superimposition of the compressed data unit onto the set of PCM speech samples, whereby the data in certain pre-determined lower-significance bit positions of each of the PCM speech samples is over-written by the compressed data. Thus, for a particular PCM speech sample, only the remaining higher-significance bit positions contain the real PCM speech sample. In a specific example, bit positions 0, 1 and 2 of an 8-bit PCM speech sample are used to carry a portion of the compressed data unit, such that only bit positions 3 to 7 contain the real data of the PCM speech sample. Alternatively, only a subset of the corresponding set of PCM speech samples is used to carry the compressed data unit.

Specific to the receiving base station controller, data received from the sending base station controller is no longer checked for the presence of an identifier. Rather, the format of the data is checked in order to reveal whether the data is being sent in a first or second condition. In the first condition, the received data is being transmitted simultaneously in PCM form and in compressed form. In the second condition, the received data is being transmitted in PCM form. The control unit 300 receives the audio data signal from the sending base station controller at input 308. The signal is then passed to a signal splitter 302, responsible for splitting the audio data signal into two parts, a first part representative of the audio data signal in PCM form, a second part representative of the audio data signal in compressed form. The first part of the data signal is sent over link 312 to the correlator unit 306, where it is stored in a buffer.

The second part of the data signal is sent over link 310 to a local decoder 304, where it is converted to PCM (decompressed) form. Note that, alternative to the use of a local decoder 304, the decoder of the codec at the base station controller could be used to perform the conversion of the second part of the data signal. The decoder 304 outputs the reconstructed PCM data to the correlator unit 306, over link 314. The correlator unit 306 is operative to determine the level of correlation between the original PCM data received (first part of the audio data signal) and the reconstructed PCM data (output from the decoder 304). The correlator unit 306 then compares this level of correlation to a certain pre-defined threshold level in order to determine whether the communication is in bypass or non-bypass mode. If the level of correlation is above the threshold level, a control signal 316 is issued by the control unit 300 that enables the signal converter at the base station controller to acquire the bypass mode of operation. If the correlation level is below the threshold level, the control signal 316 enables the signal converter to acquire the non-bypass mode of operation.

Assume that bit-stealing is used to superimpose the compressed data unit onto the corresponding set of PCM speech samples at the sending base station controller. For each unit of data received at the control unit 300, the signal splitter 302 extracts the data in certain pre-determined higher-significance bit positions of the data unit (first part) and sends this data to the correlator unit 306. The data remaining in the lower-significance bit positions (second part) is sent to the decoder 304 for conversion.

In the case of bypass mode, the data received from the sending base station controller will be a compressed data unit, superimposed onto its corresponding set of PCM speech samples. Upon decoding the compressed data contained in the lower-significance bit positions of the PCM speech samples, a set of re-constructed PCM speech samples will result. Upon comparison of these re-constructed PCM speech samples to the original PCM speech samples extracted from the higher-significance bit positions, the level of correlation will be higher than the pre-defined threshold level of correlation. Consequently, the control unit 300 of the receiving base station controller will deduce that communication from the sending base station controller is in the form of compressed data and that the transmission system is in bypass mode. Note that the original PCM speech samples received are corrupted, due to the bits robbed to transmit the compressed data unit. However, as the bits robbed are only those of lower significance, enough data integrity is maintained such that a comparison of the original set of PCM speech samples to the set of re-constructed PCM speech samples will result in a level of correlation that is higher than the threshold level of correlation.

In the case where the sending base station controller switches to non-bypass mode, the data received at the receiving base station controller will be in the form of PCM speech samples. Unaware of the change in mode of communication, the control unit 300 at the receiving base station controller will continue to decode the data contained in the lower-significance bit positions in order to obtain what is assumed to be a set of re-constructed PCM speech samples. Since the data contained in the lower-significance positions of the PCM speech samples was not compressed data to begin with, a comparison of the set of re-constructed PCM speech samples to the original set of PCM speech samples extracted from the higher-significance bit positions will result in a level of correlation that is lower than the pre-defined threshold level of correlation. Consequently, the control unit will deduce that communication from the sending base station controller to the receiving base station controller has switched to non-bypass mode and that the received data is in the form of PCM speech samples. The control unit will then generate and transmit to the corresponding signal converter a control signal 316 to activate encoding of the received PCM speech samples prior to the transmission of the compressed data to the receiving mobile terminal.

The above description of a preferred embodiment should not be interpreted in any limiting manner since variations and refinements can be made without departing from the spirit of the invention. The scope of the invention is defined in the appended claims and their equivalents.

We claim:

1. A signal processor, comprising:
   an input for receiving an audio data signal conveying speech sound information;
   an output;
   a signal converter coupled to said input for processing the audio data signal at said input, said signal converter capable to selectively acquire a first operative mode and a second operative mode, in said first operative mode said signal converter converting the audio data signal from a first format to a second format and releasing the audio data signal in said second format from said output, in said second operative mode said signal converter permitting passage of the audio data signal to said output without conversion to said second format;
   a control unit coupled to said signal converter for controlling the operative mode of said signal converter, said control unit being responsive to a first control signal to enable said signal converter to switch from said first operative mode to said second operative mode, said first control signal being indicative that the signal processor is in communicative relationship with a remote signal processor capable to operate in either one of said first and second operative modes, said control unit being further responsive to a second control signal representative of a type of speech activity in the audio data signal to prevent said signal converter from switching from said first operative mode to said second operative mode.

2. A signal processor as defined in claim 1, wherein the first format is a compressed version of the audio data signal in the second format.

3. A signal processor as defined in claim 2, wherein said signal converter includes a decoder.

4. A signal processor as defined in claim 3, wherein said decoder is a VSELP decoder.

5. A signal processor as defined in claim 1, wherein said second control signal is indicative of the presence of speech sounds in the audio data signal.

6. A signal processor as defined in claim 5, wherein the audio data signal includes a plurality of successive data frames, said signal processor including a detector coupled to said input for distinguishing data frames containing speech sounds from data frames containing non-speech sounds, said detector being operative to generate said second control signal on a basis of data frames of the audio data signal processed by said detector.

7. A signal processor, comprising:
   an input for receiving an encoded audio data signal conveying speech sound information;
   an output;
   a signal decoder coupled to said input for processing the encoded audio data signal at said input, said signal decoder being capable to transition from an active state in which the audio data signal is decoded and transferred to said output in a decoded form to an inactive state in which the audio data signal is passed to said output without decoding;
   a control unit coupled to said signal decoder for controlling the state of said signal decoder, said control unit being responsive to a first control signal to enable said signal decoder to switch from said active state to said inactive state, said first control signal being indicative that the signal processor is in communicative relationship with a remote signal processor capable to operate in either one of said active and inactive states, said control unit being further responsive to a second control signal representative of a type of speech activity in the audio data signal to prevent said signal decoder from switching from said active state to said inactive state.

8. A signal processor, comprising:
   input means for receiving an audio data signal conveying speech sound information;
   output means;
   signal converter means coupled to said input means for processing the audio data signal at said input means, said signal converter means capable to selectively acquire a first operative mode and a second operative mode, in said first operative mode said signal converter means converting the audio data signal from a first format to a second format and releasing the audio data signal in said second format from said output means, in said second operative mode said signal converter means permitting passage of the audio data signal to said output means without conversion to said second format;
   control means coupled to said signal converter means for controlling the operative mode of said signal converter means, said control means being responsive to a first control signal to enable said signal converter means to switch from said first operative mode to said second operative mode, said first control signal being indicative that the signal processor is in communicative relationship with a remote signal processor capable to operate in either one of said first and second operative modes, said control means being further responsive to a second control signal representative of a type of speech activity in the audio data signal to prevent said signal converter means from switching from said first operative mode to said second operative mode.

9. A method for processing an audio data signal conveying speech sound information in a signal processor, said signal processor including:
   an input for receiving an audio data signal conveying speech sound information;
   an output;
   a signal converter coupled to said input for processing the audio data signal at said input, said signal converter capable to selectively acquire a first operative mode and a second operative mode, in the first operative mode said signal converter converting the audio data signal from a first format to a second format and releasing the audio data signal in said second format from said output, in said second operative mode said signal converter permitting passage of the audio data signal to said output without conversion to said second format:

said method comprising:

a) in response to a first control signal indicative that the signal processor is in communicative relationship with a remote signal processor capable to operate in either one of said first and second operative modes, enabling said signal converter to switch from said first operative mode to said second operative mode;

b) in response to a second control signal representative of a type of speech activity in the audio data signal, preventing said signal converter from switching from said first operative mode to said second operative mode.

10. A method for processing an audio data signal conveying speech sound information in a signal processor as defined in claim 9, wherein said second control signal indicates that a level of speech activity in the audio data signal is above a certain threshold.

11. A method for processing an audio data signal conveying speech sound information as defined in claim 9, wherein the audio data signal in the first format is a compressed version of the audio data signal in the second format.

12. A method for processing an audio data signal conveying speech sound information as defined in claim 11, wherein the audio data signal in the second format is a PCM signal.

13. A transmission system, comprising:

a first signal processor;

a second signal processor; and a transmission facility linking said first signal processor to said second signal processor;

said first signal processor including:

a) an input for receiving an audio data signal conveying speech sound information;

b) an output coupled to said transmission facility:

c) a signal converter coupled to said input for processing the audio data signal at said input, said signal converter being capable to selectively acquire a first operative mode and a second operative mode, in said first operative mode said signal converter converting the audio data signal from a first format to a second format and transmitting the audio data signal in said second format to said second signal processor via said output, in said second operative mode said signal converter permitting passage of the audio data signal to said second signal processor via said output without conversion to said second format;

said first signal processor being responsive to a first control signal indicative that said second signal processor is capable to operate in either one of said first and second operative modes to enable said signal converter to switch from said first operative mode to said second operative mode;

said first signal processor being further responsive to a second control signal indicative of a level of speech activity in the audio data signal to prevent said signal converter from switching from said first operative mode to said second operative mode.

14. A transmission system as defined in claim 13, wherein the audio data signal in the first format is a compressed version of the audio data signal in the second format.

15. A transmission system as defined in claim 14, wherein said first signal processor includes a decoder.

16. A transmission system as defined in claim 15, wherein said second signal processor includes an encoder.

17. A transmission system as defined in claim 15, wherein said decoder is a VSELP decoder.

18. A transmission system as defined in claim 16, wherein said encoder is a VSELP encoder.

19. A transmission system as defined in claim 13, wherein said level of speech activity in the audio data signal is indicative that the audio data signal contains speech sounds.

20. A transmission system as defined in claim 13, wherein the audio data signal includes a plurality of successive data frames, said first signal processor including a detector coupled to said input for processing the data frames to distinguish data frames containing speech sounds from data frames containing non-speech sounds, said detector being operative for generating said second control signal indicative of a level of speech activity in the audio data signal on a basis of data frames of the audio data signal processed by said detector.

* * * * *